No. 844,725. PATENTED FEB. 19, 1907.
W. S. HOWELL.
WHEEL ATTACHMENT FOR SLEDS.
APPLICATION FILED MAR. 30, 1906.
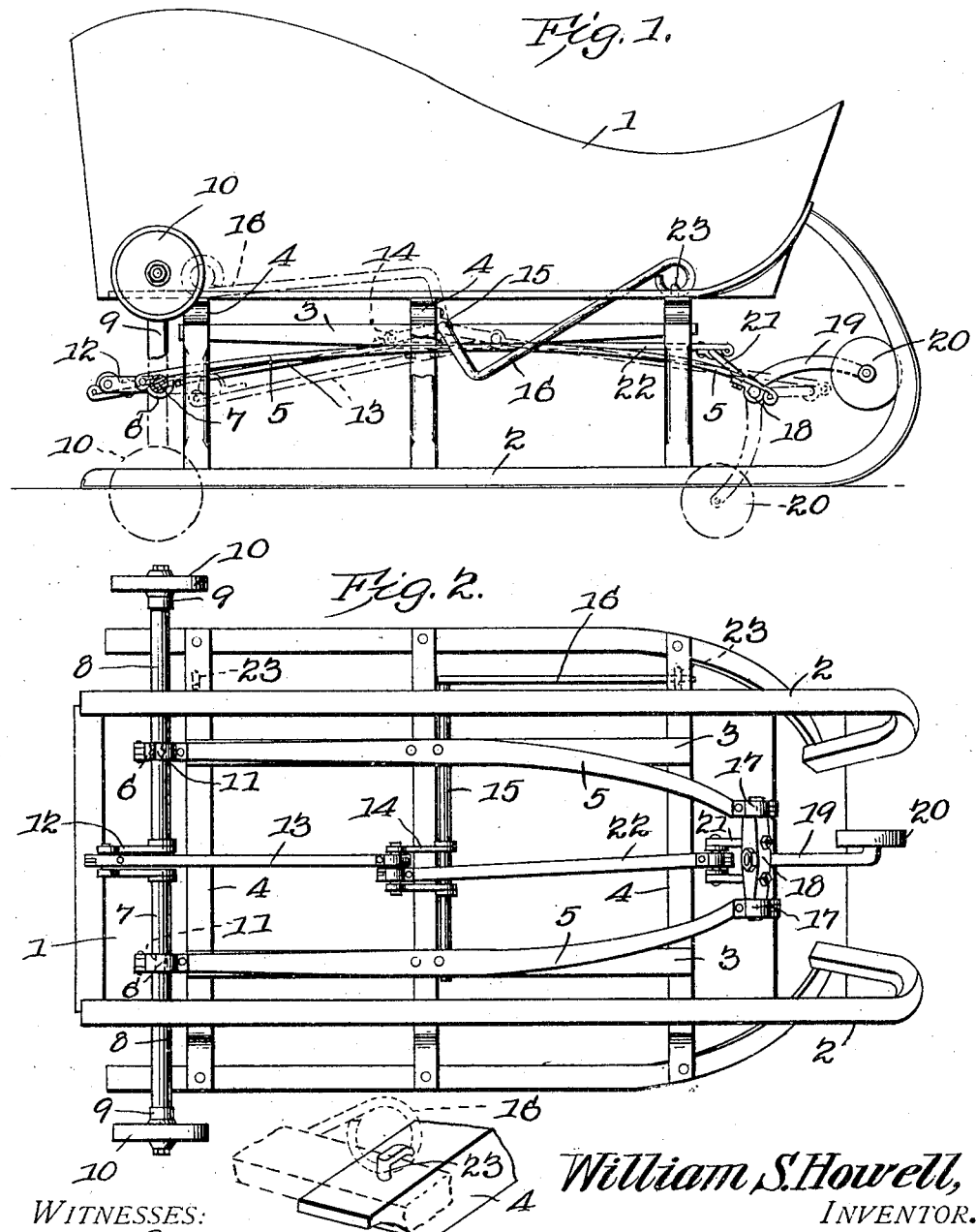
William S. Howell,
INVENTOR.

UNITED STATES PATENT OFFICE.

WILLIAM S. HOWELL, OF STANTON, MICHIGAN.

WHEEL ATTACHMENT FOR SLEDS.

No. 844,725.     Specification of Letters Patent.     Patented Feb. 19, 1907.

Application filed March 30, 1906. Serial No. 308,960.

*To all whom it may concern:*

Be it known that I, WILLIAM S. HOWELL, a citizen of the United States, residing at Stanton, in the county of Montcalm and State of Michigan, have invented a new and useful Wheel Attachment for Sleds, of which the following is a specification.

This invention relates to sleighs; and its object is to provide a wheel attachment for use in the event of sudden thaws or when for any reason it is desired to raise the runners out of contact with the ground.

Another object is to provide a wheel attachment of this character which is normally disposed out of operative position and which can be readily moved into position upon the ground so as to raise the sleigh.

A still further object is to provide spring connections between the wheel attachments and the sleigh-body, so that while the wheels are being used the occupants of the sleigh will not be jolted while the device is passing over rough surfaces.

With the above and other objects in view the invention consists of a sleigh of any desired construction having springs secured to the bottom thereof. The rear ends of these springs constitute bearings for a rotatable axle having arms at its ends on which are mounted wheels. A cross-strip is rotatably mounted between the other ends of the springs and a caster is pivotally connected thereto. An operating-lever is mounted on the sleigh and is connected to the axle and the cross-strip, so that all of the wheels can be simultaneously raised or lowered.

The invention also consists of certain other novel features of construction and combinations of parts, which will be hereinafter more fully described, and pointed out in the claims.

In the accompanying drawings is shown the preferred form of the invention.

In said drawings, Figure 1 is a side elevation of the device, one of the axle-arms and uprights being broken away and the wheels being shown by dotted lines in their lowered position. Fig. 2 is a bottom plan view, and Fig. 3 is a detail view, of one of the lever-locking devices.

Referring to the figures by numerals of reference, 1 is a sleigh-body supported in any preferred manner upon runners 2. Longitudinally-extending strips 3 are secured to the bolsters 4 of the body, and secured to these strips adjacent their centers are longitudinally-extending springs 5. The rear ends of these springs are formed with eyes 6, in which is rotatably mounted a rear axle 7, which projects beyond the runners and terminates in parallel arms 8, having outstanding studs 9, on which wheels 10 are mounted. These portions of the axle located within the eyes 6 are reduced in diameter, as shown at 11, so as to prevent longitudinal displacement of the axle in relation to the springs. A crank 12, formed adjacent the center of the axle 7, has an actuating-rod 13 connected to it and to a crank 14, formed at one end of a rod 15. This rod is rotatably mounted on one of the bolsters 4 adjacent the center of the sleigh and has a lever 16 at one end extending close to the sides of the sleigh-body, so that it can be readily manipulated by the occupants of the sleigh.

Eyes 17 are formed at the front ends of the springs 5 and constitute bearings for the ends of the cross-strip 18. Rotatably mounted in this cross-strip is one end of a stem 19, having a front wheel 20 thereon, said wheel and its stem constituting a caster. A loop 21 extends forward from the cross-head and has a rod 22 pivoted to the center thereof, said rod being connected at its other end to the crank 14.

It will be seen that by constructing and arranging the parts as herein described the arms 8 will be swung rearwardly and upwardly and the caster will be swung forward and upward simultaneously. The wheels will therefore be held above the surface of the ground, and runners 2 can be pulled thereover. Should it be desired to raise the runners above the ground, the lever is drawn backward and the crank 14 will move the rods 13 and 15 forward, so as to swing arms 8 and wheels 10 downward against the ground and at the same time swing the caster downward, so that its wheel 20 will contact with the ground. When the parts are in this position, the front rod 22 will bear upon the cross-strip 18, and as the caster-wheel is disposed back of said cross-strip the parts will be held in lowered position by the weight of the sleigh. Hooks 23 are preferably provided for engaging the lever after it has been thrown either forward or backward, thereby holding it against displacement. Importance is attached to the fact that the caster and the rear axle are journaled in springs, and therefore the occupants of the sleigh-body will not be jolted while the wheels are running over uneven surfaces. The wheels can be raised or lowered without the necessity of the occupants of the sleigh leaving it, and when the wheels are raised they assume positions where they will not in the least interfere with the use of the runners and will not to any appreciable extent detract from the appearance of the sleigh.

What is claimed is—

1. The combination with a sleigh; of longitudinally-disposed springs connected to the bottom of the sleigh, a crank-axle journaled in one end of the springs and having arms extending at angles therefrom, wheels carried by said arms, a cross-bar journaled in the other end of the spring, a caster carried thereby, and means for simultaneously swinging the caster and the wheels of the crank-axle away from or into contact with the ground.

2. The combination with a sleigh; of longitudinally-extending springs secured to the bottom thereof, a crank-axle journaled in one end of the springs, wheels connected to the ends of the axle, a cross-bar journaled in the other end of the springs, a caster pivoted to the cross-bar, a forward extension upon the cross-bar, an operating-crank, and rods connecting said crank with the crank-axle, and the extension of the cross-bar, one of said rods adapted to bear upon the cross-bar.

3. The combination with a sleigh; of a longitudinally-extending spring secured to the bottom thereof, a crank-axle journaled in one end of the spring, wheels connected to the ends of the axle, a cross-bar journaled in the other end of the spring, a caster pivoted to the cross-bar, a forward extension upon the cross-bar, an operating-crank, and rods connecting said crank with the crank-axle and the extension of the cross-bar, a lever for actuating the operating-crank and means for locking the lever in adjusted position.

4. The combination with a sleigh having longitudinally-disposed strips thereunder; of springs secured to the strips and extending longitudinally thereon, a crank-axle journaled in one end of the springs, arms carried thereby, wheels journaled on the arms, a cross-bar journaled in the other end of the springs, a caster pivotally connected to the cross-bar, a loop extending forward from the cross-bar, an operating-crank, rods connecting said crank with the loop and the crank of the axle, and a lever for manually actuating the operating-crank to swing the caster and wheels simultaneously into or out of contact with the ground.

In testimony that I claim the foregoing as my own I have hereto affixed my signature in the presence of two witnesses.

WILLIAM S. HOWELL.

Witnesses:
    CHAS. W. FRENCH,
    ERNEST G. BRAINERD.